United States Patent [19]

Jones

[11] Patent Number: 4,459,867
[45] Date of Patent: Jul. 17, 1984

[54] RESETTABLE FORCE LIMITING DEVICE

[75] Inventor: Teddy L. Jones, Rockford, Ill.

[73] Assignee: Sundstrand Corporation, Rockford, Ill.

[21] Appl. No.: 335,129

[22] Filed: Dec. 28, 1981

[51] Int. Cl.³ ................... F16H 27/02; F16H 29/20
[52] U.S. Cl. ........................ 74/89.15; 74/412 TA;
  192/4 R; 192/150
[58] Field of Search ........ 74/412 TA, 89.15, 424.8 R;
  192/4 R, 97, 144, 149, 150

[56] References Cited

U.S. PATENT DOCUMENTS

| | | | |
|---|---|---|---|
| 2,701,478 | 2/1955 | Riess | 74/424.8 R |
| 3,269,199 | 8/1966 | Deehan et al. | 74/424.8 R |
| 3,802,281 | 4/1974 | Clarke | 74/89.15 |
| 3,968,705 | 7/1976 | Amano et al. | 74/412 TA |
| 3,994,178 | 11/1976 | Hore | 74/89.15 |
| 4,179,944 | 12/1979 | Conner | 74/89.15 |
| 4,318,304 | 3/1982 | Lang | 74/89.15 |

FOREIGN PATENT DOCUMENTS 2405405  6/1979  France ................. 74/424.8 R

Primary Examiner—Lawrence J. Staab
Assistant Examiner—Michael J. Gonet
Attorney, Agent, or Firm—Harold A. Williamson; Ted E. Killingsworth; Michael B. McMurry

[57] ABSTRACT

This invention relates to a resettable force limiting assembly of the ball and screw type employed in a flight control actuation system. The resettable force limiting assembly includes a force transmitting reciprocating output member drivingly carried by an actuating member mounted for rotation in a housing. A reversible torque input is mechanically coupled to the actuating member to cause the output member to move in a direction dependent upon the direction of rotation of the input. A reciprocating reaction plate is secured for rotation with the actuating member. In operating cooperation with the reaction plate is a reaction plate engagement assembly that has elements secured against rotation to the housing. The elements are disposed on either side of the reaction plate. The elements have compression springs coupled thereto to resiliently separate the elements while allowing the elements to individually move towards and away from the reaction plate. The reaction plate, in turn, has springs resiliently positioning the reaction plate between a pair of force transmitting means in the form of snap rings secured to the actuating member whereby tension and compression forces above a predetermined value experienced by the output member result in the reaction plate being deflected into engagement with one of the reaction plate engagement elements depending upon the direction of the tension and compression forces experienced by the output member to thereby cause any additional input torque to be reacted into the housing. Reverse rotation of the input torque will result in the release of one of the reaction plate engagement elements to thereby reset the force limiting assembly.

15 Claims, 2 Drawing Figures

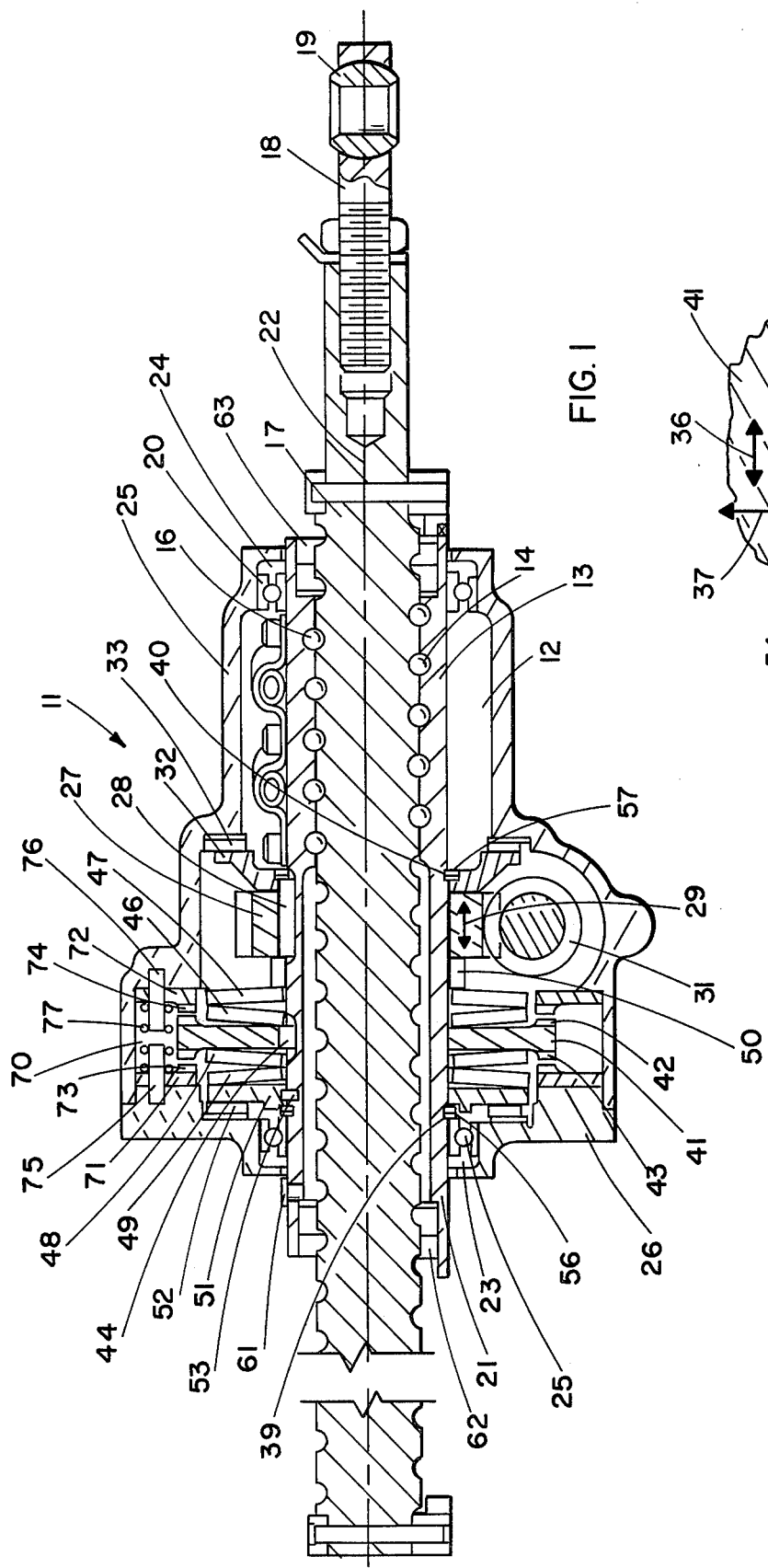
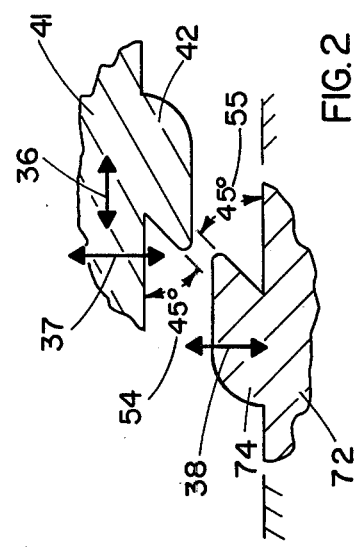
FIG. 1
FIG. 2

RESETTABLE FORCE LIMITING DEVICE

TECHNICAL FIELD

This invention relates to a resettable force limiting assembly.

BACKGROUND ART

Historically, it has been recognized, especially in actuation of the control surfaces of aircraft or linkages thereto, that should a jam occur anywhere in the actuation path, the power delivered to the jammed linkages or control surfaces could result in serious damage to the aircraft structure or the flight control surfaces themselves.

The developers of recirculating ball and screw type actuators have long recognized that overloading of the actuator may occur when excessive loads are encountered. In order to prevent damage to the actuator or to the apparatus being operated, many load absorbing mechanisms have been produced. Typical of this effort is the arrangement shown in the Clarke U.S. Pat. No. 3,802,281. The Clarke patent discloses a driving arrangement for a lead screw 21 mounted for reciprocation in a recirculating ball/nut assembly 18. The nut assembly 18 is, in turn, mounted in a tubular drive member 14 that has integral, therewith, a spur gear 17 which is drivingly connected to a bevel gear arrangement 11, 12. Power is delivered through the bevel gear arrangement 11, 12 to the actuator. The drive member 14 is resiliently coupled to the nut 18 so as to be rotatable relative to the nut member 18 at a predetermined torque load. A brake in the form of rollers 31 jammed against the actuator body 10 operates in response to the aforementioned relative rotation. A flange 33 on nut 18 cooperates with friction pad 35 to brake the rotary motion of the nut when an axial load is applied to the lead screw.

The resettable load limiter of Clarke senses torque across an axial loaded ball ramp in which the differential motion generated results in the engagement of a radial cam and roller brake. The invention to be described hereinafter does not require the sensing of torque in that the apparatus embodying the invention senses an axial load directly which causes axial differential motion across resilient springs to engage negative rake angle jaw teeth. The resettable load limiter embodying the invention is inherently more sensitive to axial loading than the torque limiter of Clarke, and can therefore trip closer to the maximum operating load.

The inventive arrangement to be described provides an extremely compact arrangement with fewer parts and a no slip positive braking of the rotary torque input to the ball/screw nut assembly.

DISCLOSURE OF INVENTION

The present invention relates to a resettable force limiting assembly of the ball and screw type employed in a flight control actuation system. The resettable force limiting assembly includes a force transmitting reciprocating output member drivingly carried by an actuating member mounted for rotation in a housing. A reversible torque input is mechanically coupled to the actuating member to cause the output member to move in a direction dependent upon the direction of rotation of the input. A reciprocating reaction plate is secured for rotation with the actuating member. In operating cooperation with the reaction plate is a reaction plate engagement assembly that has elements secured against rotation to the housing. The elements are disposed on either side of the reaction plate. The elements have compression springs coupled thereto to resiliently separate the elements while allowing the elements to individually move towards and away from the reaction plate. The reaction plate, in turn, has springs resiliently positioning the reaction plate between a pair of force transmitting means in the form of snap rings secured to the actuating member whereby tension and compression forces above a predetermined value experienced by the output member result in the reaction plate being deflected into engagement with one of the reaction plate engagement elements depending upon the direction of the tension and compression forces experienced by the output member to thereby cause any additional input torque to be reacted into the housing. Reverse rotation of the input torque will result in the release of one of the reaction plate engagement elements to thereby reset the force limiting assembly.

It is therefore a primary object of this invention to provide a resettable force limiting device for use in conjunction with a ball/nut assembly and screw actuator that responds to forces present in the screw to limit the transmission of power to the screw should the ball/nut assembly carried on the screw experience compression or tension axial loading, while simultaneously being instantly resettable upon reversal of input torque delivered to the ball/nut assembly.

A further object of this invention is to provide a force limiting assembly for use in conjunction with ball/nut assembly and screw actuator that has a preset load limit beyond which, the resettable force limiter locks up to preclude the further transmission of power to the ball/nut and screw actuator.

Yet another object of the invention is to provide a resettable load limiter that is simple in design, has fewer parts, weighs less, is compact and easier to manufacture and is therefore cheaper to build than any of the load limiter devices of the prior art.

In the attainment of the foregoing objects, the invention contemplates that the resettable force limiting assembly will include a force transmitting reciprocating output member in the form of a lead screw. The lead screw is carried by an actuating member in the form of a recirculating ball/nut assembly slideably mounted for rotation about an axis in a fixed housing. A helical gear is slideably secured for rotation with the actuating member. An input torque worm gear is drivingly coupled to the helical gear such that rotation of the helical gear by the input torque worm gear causes the output member, i.e., the lead screw, to move in a direction dependent upon the direction of rotation of the worm gear.

A reaction plate which takes the form of an annular plate having teeth disposed at an angle to the sides thereof, is slideable along the axis and is secured for rotation with the actuating member, i.e., recirculating ball/nut assembly. A reaction plate engagement assembly having elements secured against rotation to the housing is positioned such that the elements are disposed on either side of the reaction plate. The reaction plate engagement assembly elements have mating sets of teeth spaced apart from the reaction plate teeth. The elements are resiliently separated and individually axially moveable on pins secured to the housing. The reaction plate and the helical gear have belleville springs resiliently positioning the reaction plate and the helical gear between first and second spaced apart force transmitting snap rings secured to the actuating member. This unique arrangement allows axial tension and axial compression forces above a predetermined value set by the belleville springs and experienced by the output member to result in the annular teeth of reaction plate being deflected into engagement with the mating teeth of one of the reaction plate engagement assembly elements depending upon the direction of the tension and compression forces to thereby cause any additional input torque to be reacted into the housing. In order to accomplish the resetting of the force limiting assembly the operater need only momentarily reverse the rotation of the input torque which results in the release of a reaction plate engagement means element thereby resetting the force limiting assembly for further use.

Other objects and advantages of the present invention will be apparent upon reference to the accompanying description when taken in conjunction with the following drawings.

BRIEF DESCRIPTION OF THE DRAWINGS

FIG. 1 is cross-sectioned through the resettable force limiting assembly according to the invention; and FIG. 2 is an illustration of the mating relationship of reaction plate slide teeth and the teeth of the reaction plate engagement element.

BEST MODE FOR CARRYING OUT THE INVENTION

Reference is now made to FIG. 1 which illustrates in full section, a resettable force limiting assembly 11 embodying the invention. The assembly 11 includes at the right hand end thereof, a recirculating ball/nut subassembly 12 which is conventional in its basic configuration. The ball/nut assembly includes a nut 13 or actuating member as it may be termed, which nut 13 cooperates with balls 14, 15 for example. Mounted for rotary and reciprocating movement along axis 22 is a lead screw 17. The lead screw 17 will also be referred to hereinafter as a force transmitting actuating member. At the right hand end of the lead screw there is illustrated a threadably secured rod 18 which has an output pivot piece 19 fitted thereto as shown in FIG. 1. The output pivot piece 19 is connected by linkages not shown to the flight control surfaces, the movement of which is to be controlled via the resettable force limiting assembly 11.

The nut actuating member 14 has extending to the left thereof, as shown in FIG. 1, a tubular nut extension 21.

It will be observed that the right hand end of the nut 13 is mounted for rotation in a ball bearing 24, which bearing 24 has an outer race 20 in sliding contact with a fixed housing 25. The housing 25 terminates at its left hand end with an end cover 26 fitted thereto in the manner shown. The end cover 26 is secured to the housing 25 by conventional bolts or other suitable fastening means not shown. The left hand end of the tubular nut extension 21 is similiarly mounted for rotation in a ball bearing 23, which bearing 23 has an outer bearing race 30 slideably mounted in end cover 26.

A helical gear 27 which is also referred to as a driven means is drivingly coupled to reversible input torque worm gear 31. The helical gear 27 has depicted thereon a bidirectional arrow 29 which is intended to convey the idea that the helical gear 27 is capable of being moved in a reciprocating manner constrained of course by the surrounding cooperating structure. The helical gear 27 is secured for rotation with the tubular nut extension 21 by machine key 28. To the right of the helical gear 27 in direct contact therewith, is a thrust bearing race 32 which bears upon roller bearing 32 that rolls on a not referenced bearing surface of the housing 25. The thrust bearing race 32 is keyed to the tubular nut extension 21 by the machine key 28.

Positioned to the left of the helical gear 27 is a reaction plate 41 which is slideable along the axis 22, and is secured for rotation by machine key 44 with the tubular nut extension 21 of the nut or actuating member 13. The reaction plate 41 has teeth 42, 43 disposed at an angle to the sides thereof. The configuration of the teeth 42, 43 can best be understood by a study of FIG. 2 which will be discussed in more detail hereinafter.

A reaction plate engagement assembly includes reaction plate engagement elements 71, 72 which are positioned as shown on either side of the reaction plate 41. The reaction plate elements 71, 72 have teeth 73, 74 which mate with teeth 44, 43 of the reaction plate 41. In FIG. 2 it can be seen that the teeth 42 and 74 have negative rake angles 54, 55 which result in the teeth 41, 74 being drawn into engagement upon the relative movement indicated by bidirectional arrows 36, 37, 38. The reaction plate engagement elements 71, 72 are slideably mounted on headless pins 75, 76, which pins 75, 76 are secured to the housing 25. A helical compression spring 77 resiliently biases the reaction plate engagement elements away from the reaction plate 41 and against the housing 25.

The reaction plate 41 is maintained in a neutral position by pairs of belleville springs 46, 47 and 48, 49, which springs are located as shown in FIG. 1. The design and selection of the belleville spring pins 46, 47 and 48, 49 will determined the load or force limit to be overcome before an excessive force of either tension or compression experienced by the lead screw 17, i.e., force transmitting member that will cause the reaction plate 41 and reaction plate engagement assembly to operate to cause the input torque to be reacted into the housing 25.

Belleville spring pair 46, 47 is disposed between and in contact with respectively reaction plate 41 and a spacer sleeve 50, which spacer sleeve 50 abuts helical gear 27 as shown.

Belleville spring pair 48, 49 is disposed between and in contact with respectively reaction plate 41 and thrust plate 51. The thrust plate 51 bears upon thrust roller bearings 52, which roller bearings roll on unreferenced bearing surfaces of the end cover 26. The thrust plate 52 is secured for rotation with the tubular nut extension 21 by means of a headless pin 53.

A pair of force transmitting snap rings 56, 57 positioned respectively to the left of thrust plate 51 and to the right of thrust bearing race 32, are secured to the tubular nut extension 21 in grooves 39, 40. At the left hand end of tubular nut extension there are shown schematically a grease fitting 61 and grease seals 61. Similar grease seals 63 are shown at the rght hand end of the nut or actuating member 13.

The operation of the resettable force limiting assembly 11 is stunning in its simplicity.

Input torque is delivered via the input worm gear 31 which drives the helical gear 27 in either of one or two directions. The helical gear 27 via the machine key 28 in turn drives the tubular nut extension 21, which causes the integrally secured nut or actuating member 13 to drive the lead screw or force transmitting output member 17 via balls 14, 16 in a direction dependent upon the direction of rotation of the input torque worm gear 31. Assuming that no excessive loads of compression or tension are experienced by the lead screw force transmitting actuating member 17, the resettable force limiting feature of the invention will not come into play.

In the event that the lead screw force transmitting actuating member 17 is being driven to the right, as FIG. 1 is viewed, and there arises a loading on the pivot support element 19 of a magnitude that has been determined to be excessive, then this excessive load will be reacted back through the lead screw force transmitting actuating member 17, the balls 14, 16, the nut 13 and its tubular nut extension 21, the force transmitting snap ring 57, the thrust bearing race 42, helical gear 27, spacer sleeve 50, belleville spring pair 46, 47 to reaction plate 41, belleville spring pair 48, 49, thrust plate 51, thrust roller bearing 52 to the end cover 26 of the housing 25. If the loading just described is sufficient to compress or overcome the spring constants of belleville spring pairs 46, 47 and 48, 49, the reaction plate 41 will move to the left as viewed in FIG. 1, resulting in teeth 43 of reaction plate 41 coming into engagement with the teeth 73 of reaction plate engagement element 71, whereupon, because of the negative rake angles 54, 55 of the mating teeth, the reaction plate engagement element 71 and the reaction plate 41 will be drawn together in a locking manner and because of the headless straight pin 75, the forces present in the reaction plate 41 will be reacted into the end cover 26 of the housing 25. It should be apparent that in order to reset the assembly, there need only be the reversal of input torque to the worm gear 31 which will cause reaction plate teeth 43 to back away from reaction plate engagement element teeth 73, followed by reaction plate engagement element 71 being forced by helical compression spring 70 back against the end cover 26 of the housing 25.

In a similar fashion, should the lead screw force transmitting actuating member 17 experience tension loading, this tension loading will be reacted back through the ball/nut assembly 12 and the tubular nut extension 21 to the force transmitting snap ring 56, which in turn bears upon the thrust plate 51 and transmitts to the reaction plate 41, via the combined presence of belleville spring pairs 48, 49 and 46, 47, the tension loading. Should the tension exceed the design limits of the belleville spring pairs 48, 49 and 46, 47, the reaction plate 41 will slide to the right as viewed in FIG. 1, and cause teeth 42 thereof to engage the reaction plate engagement element teeth 74 causing the reaction plate 41 to lock up with the reaction plate engagement element 72 in the same manner as reaction plate engagement element 71 locked up with reaction plate teeth 43. Reverse torque on the input worm gear again will result in the resetting of the force limiting assembly 11. It should be noted that the operation of the resettable force limiting assembly 11 requires that the nut 13 and its tubular nut extension 21 be mounted as described earlier in bearings 23, 24 that are capable of limited sliding movement within the housing 25 and its end cover 26.

From the foregoing, it can be seen that the invention provides a resettable force limiting device that can be used in conjunction with a ball/nut assembly and screw actuator that responds to forces present in the screw to limit the transmission of power to the screw should the ball/nut carried on the screw experience either compression or tension axial loading above a preset value, while simultaneously being instantly resettable upon reversal of an input torque delivered to the ball/nut assembly.

Although this invention has been illustrated and described in connection with the particular embodiment illustrated, it will be apparent to those skilled in the art that various changes may be made therein without departing from the spirit of the invention as set forth in the appended claims.

I claim:

1. A resettable force limiting assembly including in combination:
    a force transmitting reciprocating output member drivingly carried by an actuating member mounted for rotation in a housing,
    a reversible torque input mechanically coupled to said actuating member to cause said output member to move in a direction dependent upon the direction of rotation of said input,
    a reciprocating reaction plate secured for rotation with said actuating member,
    reaction plate engagement means having elements secured against rotation to said housing,
    said elements disposed on either side of said reaction plate, said elements having means coupled thereto to resiliently separate said elements while allowing said elements to individually move towards and away from said reaction plate,
    said reaction plate having means resiliently positioning said reaction plate between a pair of force transmitting means secured to said actuating member whereby tension and compression forces above a predetermined value experienced by said output member result in said reaction plate being deflected into engagement with one of said reaction plate engagement means elements depending upon the direction of said tension and compression forces to thereby cause any additional input torque to be reacted into said housing, reverse rotation of said input torque resulting in the release of a reaction plate engagement means element to thereby reset said force limiting assembly.

2. The combination of claim 1 wherein actuating member is slideably mounted in said housing.

3. The combination of claim 2 wherein said actuating member and said output member are respectively a nut and ball and screw type.

4. The combination of claim 3 wherein said means resiliently positioning said reaction plate is formed of belleville springs positioned on either side of said reaction plate and mechanically coupled to said pair of force transmitting means.

5. The combination of claim 4 wherein said reaction plate is in the form of an annular plate having teeth disposed at an angle to the sides of said reaction plate, said reaction plate engagement means elements having annular mating sets of teeth spaced apart from said reaction plate.

6. The combination of claim 5 wherein said teeth of said reaction plate and said teeth of said reaction plate engagement means element have negative rake angles whereupon initial engagement of said teeth the reaction plate and one of said elements are drawn towards each other.

7. The combination of claim 6 wherein said reaction plate engagement means elements are slideably mounted on pins secured to said housing.

8. A resettable force limiting assembly including in combination:

a force transmitting reciprocating output member drivingly carried by an actuating member mounted for rotation about an axis in a housing, a driven means slideably secured for rotation with said actuating member, an input torque means drivingly coupled to said driven means such that rotation of said driven means by said input torque means causes said output member to move in a direction dependent upon the direction of rotation of said input torque means, a reaction plate slideable along said axis and secured for rotation with said actuating member, reaction plate engagement means having elements secured against rotation to said housing, said elements disposed on either side of said reaction plate, said elements being resiliently separated and individually axially moveable, said reaction plate and said driven means having means resiliently positioning said reaction plate and said driven means between first and second spaced apart force transmitting means secured to said actuating member whereby axial tension and axial compression forces above a predetermined value experienced by said output member result in said reaction plate being deflected into engagement with one of said reaction plate engagement means elements depending upon the direction of said tension and compression forces to thereby cause any additional input torque to be reacted into said housing, reserve rotation of said input torque resulting in the release of a reaction plate engagement means element to thereby reset said force limiting assembly.

9. The combination of claim 8 wherein said actuating member is slideably mounted in said housing.

10. The combination of claim 9 wherein said driven means is a helical gear and said input torque means is a worm gear.

11. The combination of claim 8 or 9 wherein said means resiliently positioning said reaction plate and said driven means is formed of belleville springs positioned on either side of said reaction plate and mechanically coupled to said first and second force transmitting means.

12. The combination of claim 10 wherein said actuating member and said output member are respectively a nut and ball and screw type.

13. The combination of claim 12 wherein said reaction plate is in the form of an annular plate having teeth disposed at an angle to the sides thereof, said reaction plate engagement means elements having mating sets of teeth spaced apart from said reaction plate.

14. The combination of claim 13 wherein said teeth of said reaction plate and said teeth of reaction plate engagement means element have negative rake angles whereby upon initial engagement of said teeth, the reaction plate and one of said elements are drawn toward each other.

15. The combination of claim 14 wherein said reaction plate engagement means elements are slideably mounted on pins secured to said housing.

* * * * *